United States Patent [19]

Dicke

[11] Patent Number: 4,512,691
[45] Date of Patent: Apr. 23, 1985

[54] PILOT ADAPTOR FOR FLAT WOOD BORING BITS

[75] Inventor: William C. Dicke, Easley, S.C.

[73] Assignee: The Singer Company, Stamford, Conn.

[21] Appl. No.: 496,141

[22] Filed: May 19, 1983

[51] Int. Cl.³ .............................................. B23B 51/60
[52] U.S. Cl. .............................. 408/201; 145/116 R; 408/188
[58] Field of Search ................. 408/82, 188, 201, 224, 408/241 R; 145/116 R, 129

[56] References Cited

U.S. PATENT DOCUMENTS

| | | | |
|---|---|---|---|
| 676,669 | 6/1901 | Wack | 408/201 |
| 967,789 | 8/1910 | Baron | 408/201 |
| 1,017,352 | 2/1912 | Wagner | 408/224 |
| 1,464,298 | 8/1923 | Stein | 408/201 |
| 1,561,463 | 11/1925 | Rochemont | 408/201 |
| 2,812,791 | 11/1957 | Mackey | 408/201 X |
| 3,712,753 | 1/1973 | Manzi | 408/224 |
| 3,748,052 | 7/1973 | Jensen | 408/188 |
| 4,043,698 | 8/1977 | Chelberg | 408/201 |
| 4,079,766 | 3/1978 | Conley et al. | 145/116 R |
| 4,289,432 | 9/1981 | Elkins et al. | 408/201 |

Primary Examiner—William R. Briggs
Assistant Examiner—Glenn L. Webb
Attorney, Agent, or Firm—Edward P. Schmidt; Robert E. Smith; Edward L. Bell

[57] ABSTRACT

A pilot adaptor for a flat wood boring bit having a shank extending to two parallel flattened sides and with an axially aligned orifice extending therebetween, the pilot adaptor being implemented by an elongated rectangular sheet metal member folded over centrally thereof for two parallel legs for receiving the parallel flattened sides of the flat wood boring bits therebetween, in which the parallel legs have diagonally opposite edges spaced apart the diameter of the pilot hole so that they are received in the pilot hole. At least one centrally aligned aperture may extend through one of the parallel legs coaxially with at least one portion punched and lanced out to form a single thread so that a sheet metal screw may extend through the aperture and orifice in the flat wood boring bits and into the lanced out portion to retain the pilot adaptor to the flat wood boring bit.

5 Claims, 4 Drawing Figures

PILOT ADAPTOR FOR FLAT WOOD BORING BITS

DESCRIPTION

Background of the Invention

This invention relates to an adaptor for flat wood boring bits to enable a pilot hole to be enlarged while retaining an accurate location therefor.

Enlarging of holes in wood is frequently necessary, and the necessity therefore was recognized in the early U.S. Pat. No. 413,316, of Dobson, which provided a round block to be attached to the tip of an auger so as to axially align the same relative to a pilot hole which received the block.

This problem of axial alignment also exists when it is necessary to counterbore a hole, and the U.S. Pat. No. 3,244,033, of Jardine discloses a counterbore tool having a replaceable counterbore pilot which may be selected according to the size of the pilot hole previously formed.

Most recently, the U.S. Pat. Nos. 4,289,432 and 4,043,698, disclose adaptors for the widely used flat wood boring bite which may be attached thereto so as to enlarge a pilot hole while retaining the axial alignment thereof. U.S. Pat. No. 4,043,698 discloses a cylinder slotted to receive the flat wood boring bit and formed at the base of the slot to receive the pilot tip of the wood boring bit therein. U.S. Pat. No. 4,289,432 discloses several forms of adaptors all designed to be retained on the ends of the flat wood bit by an interference fit thereon. Both of these devices are characterized by the high cost of manufacture thereof.

What is required is an adaptor for a flat wood bit which is economical of construction but is effective to operate as a pilot therefor.

SUMMARY OF THE INVENTION

The above desired ends are achieved in a pilot adaptor for a flat wood boring bit of the type having an orifice therethrough, which pilot adaptor is fabricated of sheet metal, and which may be attached to a flat wood boring bit to operate as a pilot therefor. An elongated rectangular sheet metal member is bent substantially centrally thereof to form two parallel legs. The two parallel legs are spaced apart sufficiently to receive the flat wood boring bit therebetween. Means are provided for supporting the sheet metal member axially of the flat wood bit, for example, by extending a small screw through an aperture in one leg and tje profoce provided in flat wood boring bits of certain manufacture, and into a thread formed in the other leg of the sheet metal member. Provision may be made for two sets of apertures and threads through the sheet metal member so that the extension of the sheet metal member from the flat wood boring bits may be adjusted to accommodate for shorter pilot bores through the wood material.

BRIEF DESCRIPTION OF THE DRAWINGS

Further objects and features of the present invention will appear from the following description and appended claims when read in conjunction with the accompanying drawings wherein:

DETAILED DESCRIPTION

Figure 1:
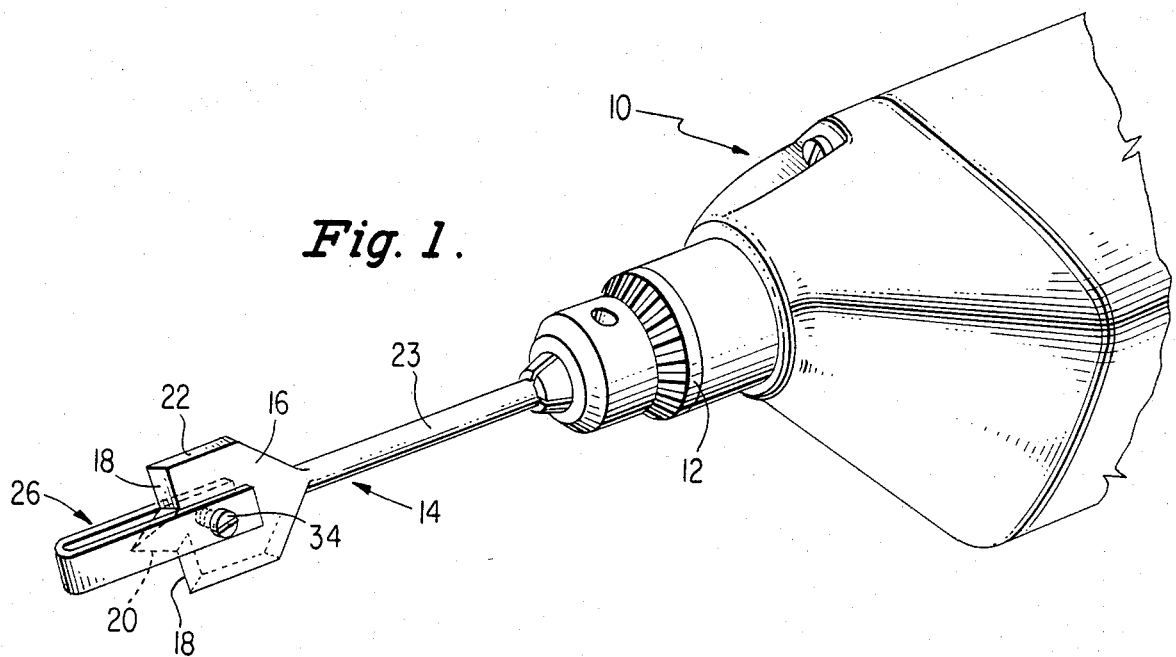
FIG. 1 is an isometric illustration of a flat wood boring bit carried in a chuck of a hand drill, and to which a pilot adaptor has been attached.
Figure 2:
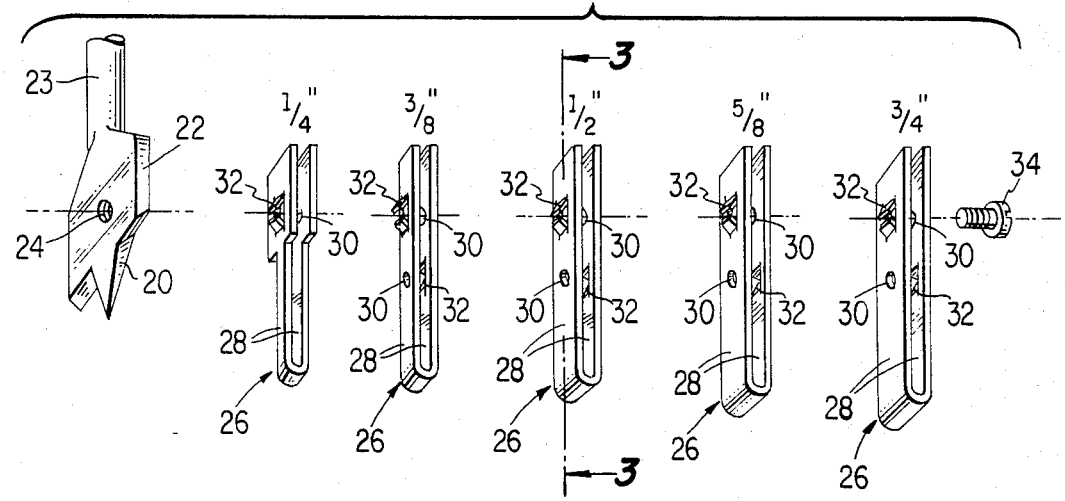
FIG. 2 is an isometric view of a portion of a flat wood boring bit and a series of pilot adaptors which may, selectively, be attached to the wood boring bit.

Referring to FIG. 1, there is shown a portable electric drill 10 including chuck 12 into which there is affixed a flat wood boring bit 14 (see also FIG. 2). The flat wood boring bit 14 is of a particular design and includes a flattened end 16 having parallel flattened sides through which an orifice 24 extends, and straight cutting edges 18 extending from a pilot tip 20 which makes the initial cut in the wood material and locates the cutting edges. Sides 22 of the flattened end 16 are accommodated within the aperture formed by the cutting edges 18, so that this aperture may be of any length up to the extent of the shank 23 of the flat wood boring bit 14. The orifice 24 is located equidistance from the sides 22. The flat wood boring bit 14 has attached thereto a pilot adaptor 26, subject of this invention.

Figure 4:
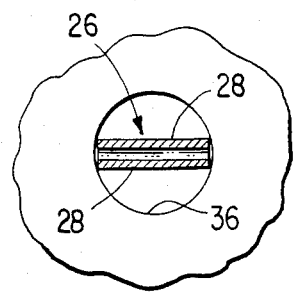
Figure 3:
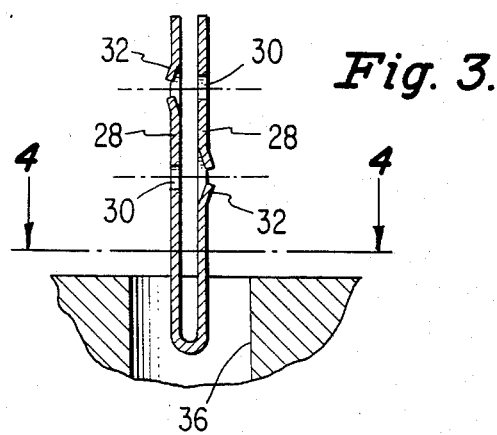
FIG. 3 is a cross-sectional view taken along line 3—3 of FIG. 2 to show the arrangement of the aperture and single thread extending through the sheet metal pilot adaptor in two places; and, FIG. 4 is a cross-sectional view of the sheet metal pilot adaptor taken along line 4—4 of FIG. 3 to show the fit of the pilot adaptor in the pilot bore.

Referring now to FIG. 2, there are shown a series of pilot adaptors 26 of from $\frac{1}{4}''$ to $\frac{3}{4}''$ in diameter. These pilot adaptors 26 are formed from an elongated rectangle of sheet metal bent substantially centrally thereof to form two parallel legs 28 (see also FIG. 3). The adaptors 26 may be formed with a single, or with a pair of apertures 30, which apertures are aligned with punched and lanced out portions 32 arranged to form a single thread. A sheet metal screw 34 may extend through aperture 30 in one of the legs 28, thourgh orifice 24 in the flat wood boring bit 14, to cooperate with punched and lanced out portion 32 to retain the pilot adaptor 26 affixed to the parallel flattened sides in the flattened end 16 of the wood boring bit 14. The aperture 30 and the punched and lanced out portion 32 are located on the midline of the pilot adaptor 26, and when the pilot adaptor is located by the centrally situated orifice 24 and extends into a pilot hole 36 in a wood construction, operation of the portable electric drill 10 will enable the cutting edges 18 of the flat wood boring bit 14 to enlarge the pilot hole 36 to the size of the wood boring bit selected for affixing the pilot adaptor 26 to. From an inspection of FIG. 4, it apparent that the diameter for the pilot hole 36 is the diagonal for the pilot adaptor 26 from one outside corner of one of the legs 28 to the diagonally opposite outside corner of the other leg 28. A pair of apertures 30 and punched and lanced out portions 32 are provided in the larger pilot adaptors 26 so that the portion of the adaptor extending beyond the cutting edges 18 of the flat wood boring bits 14 might be shortened to accommodate short pilot holes 36.

The pilot adaptors 26 may be fashioned of a hardened and tempered material. It will be apparent that as a substitute to the use of the sheet metal screw 34 a pin may be attached to one leg 28 of the pilot adaptor, to extend through an aperture in the other leg. For insertion on the flat wood boring bit 14, the legs 28 may be opened up to permit the pin attached to one of the legs to extend through orifice 24 in the wood boring bit 14, and through the aperture in the other leg, to be retained to the flat wood boring bit by the resilience of the material used to fabricate the adaptor. The pilot adaptors 26 may also be fashioned with axially aligned apertures 30, and without the punched and lanced out portion 32, so that a screw may extend through apertures 30 and orifice 24 and into a nut to retain the pilot adaptor to the flat wood boring bit 14.

While the invention has been described, disclosed, illustrated and shown in terms of a preferred embodiment or modification, other embodiments or modifications as may be suggested to those having the benefit of the teachings herein are intended to be reserved should they be carried out according to the spirit and scope of the appended claims.

I claim:

1. A pilot adaptor for a flat wood boring bit having a shank extending to two parallel flattened sides with an axially aligned orifice extending therebetween and terminating in opposed cutting edges on each side and rearwardly of a pilot tip, said pilot adaptor to accommodate said flat wood boring bit to a smaller pilot hole to enable said flat wood boring bit to drill a larger hole concentric to said pilot hole, said pilot adaptor comprising: an elongated rectangular sheet metal member bent substantially centrally thereof to form two parallel legs for receiving said parallel flattened sides of said flat wood boring bit therebetween, said parallel legs having parallel sides with diagonally opposite edges spaced apart the diameter of said pilot hole so that said legs are received therein, and means for supporting said pilot adaptor axially of said flat wood boring bit.

2. A pilot adaptor as claimed in claim 1 wherein said supporting means comprises an aperture extending through each leg in axial alignment with each other and said orifice, and means extending through said apertures and orifice for retaining said adaptor to said parallel sides of said flat work boring bit.

3. A pilot adaptor as claimed in claim 2 wherein said retaining means comprises a screw and a nut.

4. A pilot adaptor as claimed in claim 1 wherein said supporting means comprises an aperture extending through one leg, a portion punched and lanced out to form a single thread on the other leg in axial alignment with said aperture, and a screw to extend through said aperture and said orifice into said punched and lanced out portion for retaining said pilot adaptor fixed to said parallel sides of said flat wood boring bit.

5. A pilot adaptor as claimed in claim 4 further comprising a second aperture extending through said one or said other leg spaced from said aperture, and a second portion punched and lanced out to form a single thread on said other or said one leg in axial alignment with said second aperture, whereby said aperture and said punched and lanced out portion or said second aperture and said second punched and lanced out portion may be aligned with said orifice to vary the extent of said parallel legs into said pilot hole.

* * * * *